(12) United States Patent
Akazawa et al.

(10) Patent No.: US 10,450,014 B2
(45) Date of Patent: Oct. 22, 2019

(54) TRAVELING APPARATUS AND CONTROL METHOD THEREFOR

(71) Applicant: TOPY KOGYO KABUSHIKI KAISHA, Tokyo (JP)

(72) Inventors: Takuma Akazawa, Tokyo (JP); Shingo Tsukui, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 98 days.

(21) Appl. No.: 15/741,145

(22) PCT Filed: Jul. 4, 2016

(86) PCT No.: PCT/JP2016/069782
§ 371 (c)(1),
(2) Date: Dec. 29, 2017

(87) PCT Pub. No.: WO2017/006910
PCT Pub. Date: Jan. 12, 2017

(65) Prior Publication Data
US 2018/0186414 A1   Jul. 5, 2018

(30) Foreign Application Priority Data

Jul. 6, 2015   (JP) ................................ 2015-135592
Dec. 28, 2015  (JP) ................................ 2015-255852

(51) Int. Cl.
*B62D 55/084*   (2006.01)
*B62D 55/065*   (2006.01)
(Continued)

(52) U.S. Cl.
CPC .......... *B62D 55/084* (2013.01); *B62D 55/04* (2013.01); *B62D 55/065* (2013.01); *B62D 55/18* (2013.01)

(58) Field of Classification Search
CPC .... B62D 55/04; B62D 55/065; B62D 55/084; B62D 55/18
See application file for complete search history.

(56) References Cited

U.S. PATENT DOCUMENTS

2007/0145820 A1   6/2007   Hirose et al.
2009/0256280 A1  10/2009   Hirose et al.

FOREIGN PATENT DOCUMENTS

JP   63-000270 B2   1/1988
JP   2007-191153 A  8/2007
(Continued)

OTHER PUBLICATIONS

International Preliminary Report on Patentability for. PCT/JP2016/069782 dated Jul. 26, 2016, (English translation).
(Continued)

*Primary Examiner* — Kevin Hurley
(74) *Attorney, Agent, or Firm* — Thomas B. Ryan; Jodi A. Reynolds, Esq.; Harter Secrest & Emery LLP

(57) ABSTRACT

A traveling apparatus that can be moved in two directions includes a body 1, a pair of crawler units 5, crawler actuators 40 and rolling actuators 60. The crawler units 5 are supported by the body 1 such that the crawler units 5 are rotatable about a rotational axis L1. The traveling apparatus performs crawler moving in a direction of the rotational axis L1 by the crawler actuator 40 driving pairs of crawler structures 20A, 20B of the crawler units 5. The traveling apparatus performs moving by rolling in a direction orthogonal to the rotational axis L1 by the rolling actuator 60 making the crawler units 5 roll about the rotational axes L1. To prepare for the crawler moving, the crawler units 5 are made to roll to take a movable attitude based on attitude information of the crawler units 5 from rotary encoders 72.

10 Claims, 13 Drawing Sheets

(51) Int. Cl.
*B62D 55/18* (2006.01)
*B62D 55/04* (2006.01)

(56) References Cited

FOREIGN PATENT DOCUMENTS

| | | |
|---|---|---|
| JP | 2009-241916 A | 10/2009 |
| JP | 2014-051221 A | 3/2014 |
| JP | 2014-193707 A | 10/2014 |

OTHER PUBLICATIONS

International Search Report (ISR) for corresponding International Application No. PCT/JP2016/069782 (English version) dated Jul. 26, 2016.

TRAVELING APPARATUS AND CONTROL METHOD THEREFOR

FIELD OF THE INVENTION

The present invention relates to a traveling apparatus that can be moved in two directions and a method for controlling the traveling apparatus.

BACKGROUND OF THE INVENTION

A robot (traveling apparatus) disclosed in Patent Document 1 includes a pair of crawler devices extending in a front-rear direction of a body disposed on the left and right of the body. Each of the crawler devices includes front and rear wheels and a belt (endless elongated member) wrapped around the wheels.

The robot having the features mentioned above can be moved forward or backward by rotationally driving the left and right crawler devices in the same direction at the same speed. The robot can make a turn to the left or right drawing a curve by rotationally driving the left and right crawler devices at different speeds. Moreover, the robot can make a pivot turn (turning in place without moving) by rotationally driving the left and right crawler devices in different directions.

The robot cannot change directions by pivot turning at a corner of a narrow passage curving at a right angle. The robot cannot change directions by pivot turning on an uneven ground either because a resistance of the ground interferes with rotational driving of the crawler devices.

Moreover, in a case where a destination is in an oblique direction, the robot may not be able to be moved linearly to the destination, and therefore may not be able to reach the destination accurately.

Patent Document 2 discloses a robot that can be moved in two directions and that can solve the problems mentioned above. The robot includes a pair of crawler devices extending in a first direction and spaced from each other in a second direction orthogonal to the first direction. Each of the crawler devices includes a crawler unit rotatable about a rotational axis extending in the first direction. The crawler unit includes a support extending in the first direction and a pair of crawler structures mounted to the support and opposed to each other with the rotational axis extending therebetween.

The robot of Patent Document 2 can be moved in the first direction by driving the crawler structures of the pair of crawler units. A mode of moving in this manner is referred to as "crawler moving" hereinafter.

The robot can be moved in the second direction by the pair of crawler units being rotated about the rotational axes and rolling in the second direction. A mode of moving in this manner is referred to as "moving by rolling" hereinafter.

The robot of Patent Document 2 can change directions of movement from the first direction to the second direction and from the second direction to the first direction not by pivot turning but by selecting between the crawler moving and the moving by rolling. Moreover, the robot can be moved linearly in any oblique direction by performing the crawler moving and the moving by rolling at the same time. A mode of moving in this manner is referred to as "oblique moving" hereinafter.

PRIOR ART DOCUMENTS

Patent Documents

Patent Document 1: Japanese Unexamined Patent Application Publication No. 2007-191153

Patent Document 2: Japanese Unexamined Patent Application Publication No. 2009-241916

SUMMARY OF THE INVENTION

Problem to be Solved by the Invention

Each of the crawler units of the robot of Patent Document 2 includes a movable zone and a dead zone. The robot can be moved by driving the pair of crawler structures when the crawler unit is contacted with the ground at the movable zone. The robot cannot perform crawler moving when the crawler unit is contacted with the ground at the dead zone. For example, when the pair of crawler structures of the crawler unit are generally horizontally oriented, the crawler unit is contacted with the ground at the dead zone, and the robot cannot start crawler moving.

Means for Solving the Problems

To solve the problems mentioned above, the present invention provides a traveling apparatus including: a body; and a plurality of crawler devices supported by the body and extending in a first direction, the plurality of crawler devices spaced from one another in a second direction orthogonal to the first direction, wherein each of the plurality of crawler devices includes a crawler unit supported by the body such that the crawler unit is rotatable about a first rotational axis extending in the first direction, a crawler actuator and a rolling actuator; each crawler unit includes a support extending along the first rotational axis and a pair of crawler structures disposed on the support spaced from each other with the first rotational axis extending therebetween; the traveling apparatus performs crawler moving in the first direction by the crawler actuator driving the pair of crawler structures; the traveling apparatus performs moving by rolling in the second direction by the rolling actuator making the crawler unit roll about the first rotational axis; the crawler unit includes a movable zone and a dead zone, wherein when the crawler unit is contacted with the ground at the movable zone, at least one of the pair of crawler structures is contacted with the ground, and the crawler moving can be performed by driving the crawler structures, and wherein when the crawler unit is contacted with the ground at the dead zone, the crawler moving cannot be performed by driving the crawler structures; the traveling apparatus further includes attitude sensors that respectively detect attitudes of the crawler units and a control device that controls the crawler actuators and the rolling actuators; and to prepare for the crawler moving, the control device performs an attitude control of the crawler units by driving the rolling actuators based on attitude information of the crawler units from the attitude sensors to make the crawler units respectively take movable attitudes in which the crawler units are contacted with the ground at the respective movable zones.

According to the features mentioned above, controlling the attitudes of the crawler units to be movable attitudes makes the traveling apparatus surely perform crawler moving.

In one aspect of the present invention, upon receipt of a stop command signal during the moving by rolling, the control device judges whether the crawler units are in the movable attitudes or not based on the attitude information from the attitude sensors, and if the judgment is positive, the control device immediately makes the traveling apparatus stop moving, and if the judgment is negative, the control device makes the crawler units continue to roll until the crawler units respectively take the movable attitudes.

According to the features mentioned above, the traveling apparatus can smoothly start crawler moving after the attitude control because the attitude control of the crawler units is performed at the end of the moving by rolling.

The control device makes the traveling apparatus perform oblique moving by performing the moving by rolling and the crawler moving at the same time, and upon receipt of a stop command signal during the oblique moving, the control device immediately makes the traveling apparatus stop crawler moving and judges whether the crawler units are in the movable attitudes or not based on the attitude information from the attitude sensors, and if the judgment is positive, the control device immediately makes the traveling apparatus stop moving by rolling, and if the judgment is negative, the control device makes the crawler units continue to roll until the crawler units respectively take the movable attitudes.

According to the features mentioned above, the traveling apparatus can smoothly start crawler moving after the attitude control because the attitude control of the crawler units is performed at the end of the oblique moving.

In another aspect of the present invention, upon receipt of a start command signal to start the crawler moving while the traveling apparatus is stopped, the control device judges whether the crawler units are in the movable attitudes or not based on the attitude information from the attitude sensors, and if the judgment is positive, the control device immediately makes the traveling apparatus start the crawler moving, and if the judgment is negative, the control device makes the traveling apparatus start the crawler moving after making the crawler units roll until the crawler units respectively take the movable attitudes.

If the judgment is negative, the control device controls the attitudes of the plurality of crawler units by making the plurality of crawler units roll in the same direction.

The plurality of crawler units include a pair of crawler units, if the judgment is negative, the control device keeping one of the crawler units stopped, the control device makes the other of the crawler units roll, and after finishing the attitude control of the other of the crawler units, the control device controls the attitude of the one of the crawler units, keeping the other of the crawler units stopped.

According to the features mentioned above, the traveling apparatus can be constrained from being moved even if the attitude control of the crawler units is performed in a manner accompanied by the rolling.

The plurality of crawler units include a pair of crawler units, and if the judgment is negative, the control device makes the pair of crawler units roll at the same time in opposite directions, and thereby controlling the attitudes of the pair of crawler units. According to the features mentioned above, movement of the traveling apparatus can be constrained to the minimum even if the attitude control of the crawler units is performed in a manner accompanied by the rolling.

Preferably, the movable attitudes of the crawler units are reference attitudes in which the pair of crawler structures are contacted with the ground. According to the features mentioned above, the crawler moving can be started in a stable manner.

Each of the crawler structures of the crawler unit includes a pair of wheels disposed spaced from each other in the direction of the first rotational axis, an endless elongated member wrapped around the wheels and a multitude of tread lugs attached to the endless elongated member, the pair of wheels are supported by the support such that the wheels are rotatable about second rotational axes that are parallel to each other and orthogonal to the first rotational axis, a pair of ground contacting structures are attached to the support of the crawler unit, the ground contacting structures are disposed adjacent to the pair of crawler structures outside of the crawler structures in the direction of the second rotational axes, and the ground contacting structures provide the dead zones.

A method according to the present invention provides a method for controlling a traveling apparatus, the traveling apparatus including: a body; and a plurality of crawler devices supported by the body and extending in a first direction, the plurality of crawler devices spaced from one another in a second direction orthogonal to the first direction, wherein each of the plurality of crawler devices includes a crawler unit supported by the body such that the crawler unit is rotatable about a first rotational axis extending in the first direction, a crawler actuator and a rolling actuator, each crawler unit includes a support extending along the first rotational axis and a pair of crawler structures disposed on the support spaced from each other with the first rotational axis extending therebetween, the traveling apparatus performs crawler moving in the first direction by the crawler actuator driving the pair of crawler structures, the traveling apparatus performs moving by rolling in the second direction by the rolling actuator making the crawler unit roll about the first rotational axis, the crawler unit includes movable zones and dead zones, wherein when the crawler unit is contacted with the ground at the movable zone, at least one of the pair of crawler structures is contacted with the ground, and the crawler moving can be performed by driving the crawler structures, and wherein when the crawler unit is contacted with the ground at the dead zone, the crawler moving cannot be performed by driving the crawler structures, the method including: controlling attitudes of the crawler units to prepare for crawler moving by driving the rolling actuators based on attitude information of the crawler units from attitude sensors to make the crawler units respectively take movable attitudes in which the crawler units are respectively contacted with the ground at the movable zones.

Advantageous Effects of the Invention

According to the present invention, the traveling apparatus can turn at the right angle for changing directions without scraping the ground and can be moved straight in an oblique direction. Moreover, the crawler moving can be surely started by attitude control of the crawler units.

MODE FOR CARRYING OUT THE INVENTION

A robot (traveling apparatus) according to a first embodiment of the present invention will be described hereinafter with reference to the drawings. Direction X (first direction) and direction Y (second direction) orthogonal to each other are defined in FIGS. 1 and 2.

Figure 1:
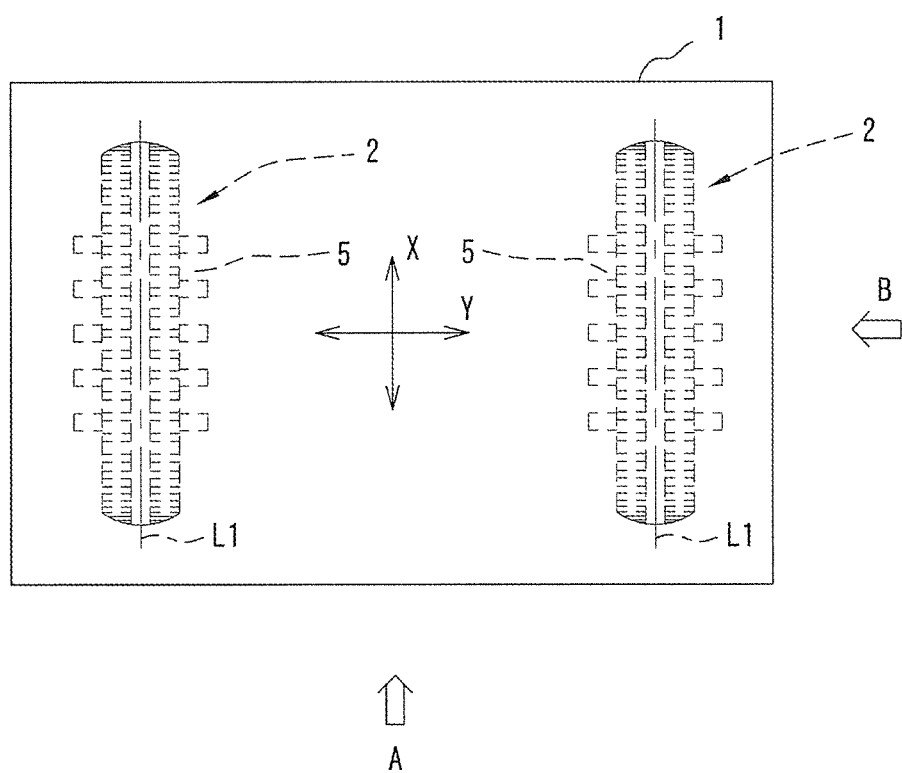
FIG. 1 is a plan view of a robot (traveling apparatus) according to a first embodiment of the present invention having a pair of crawler devices incorporated therein, shown with some features thereof omitted.
Figure 2:
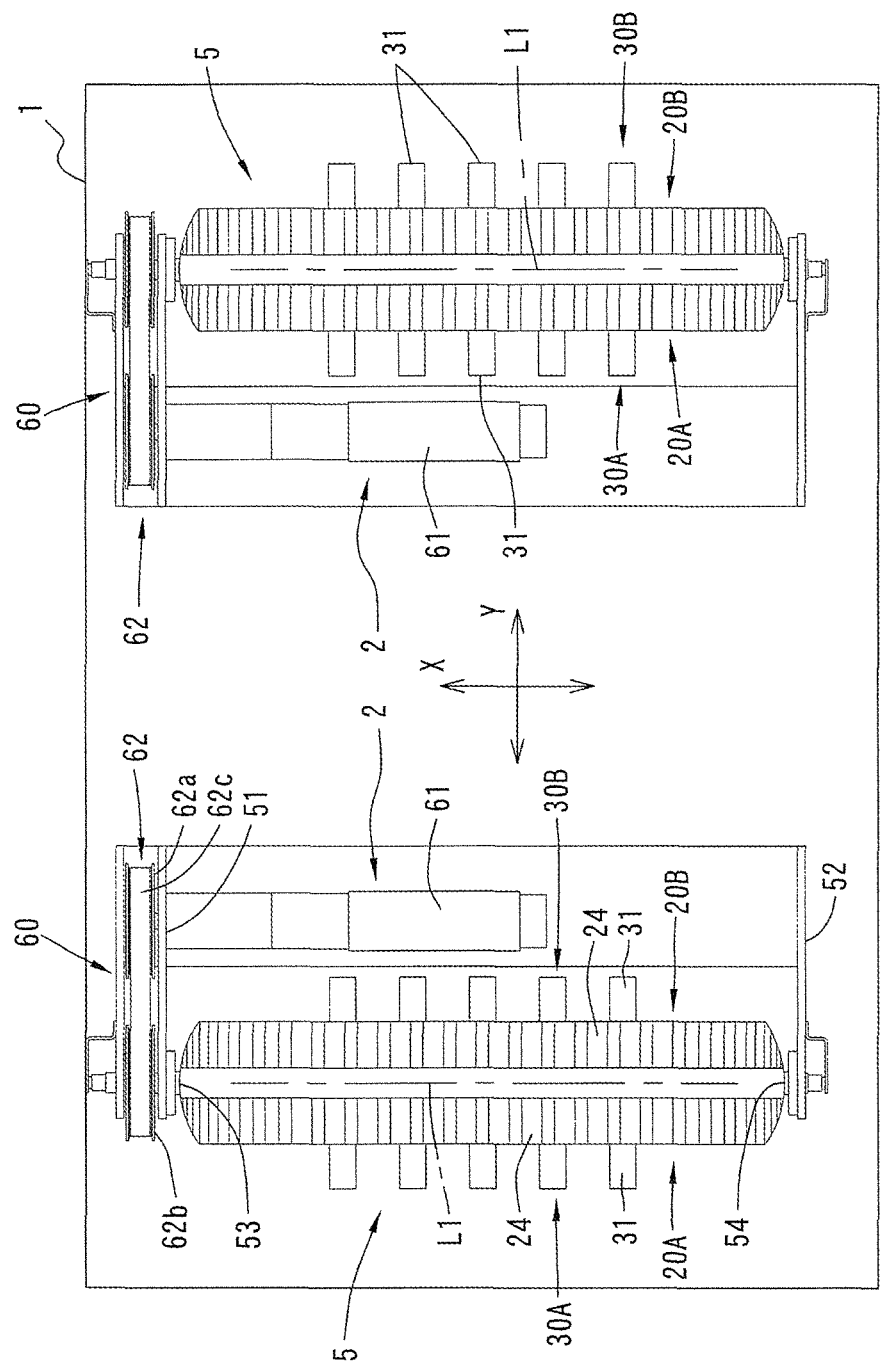
FIG. 2 is a bottom view of the robot.
Figure 3:
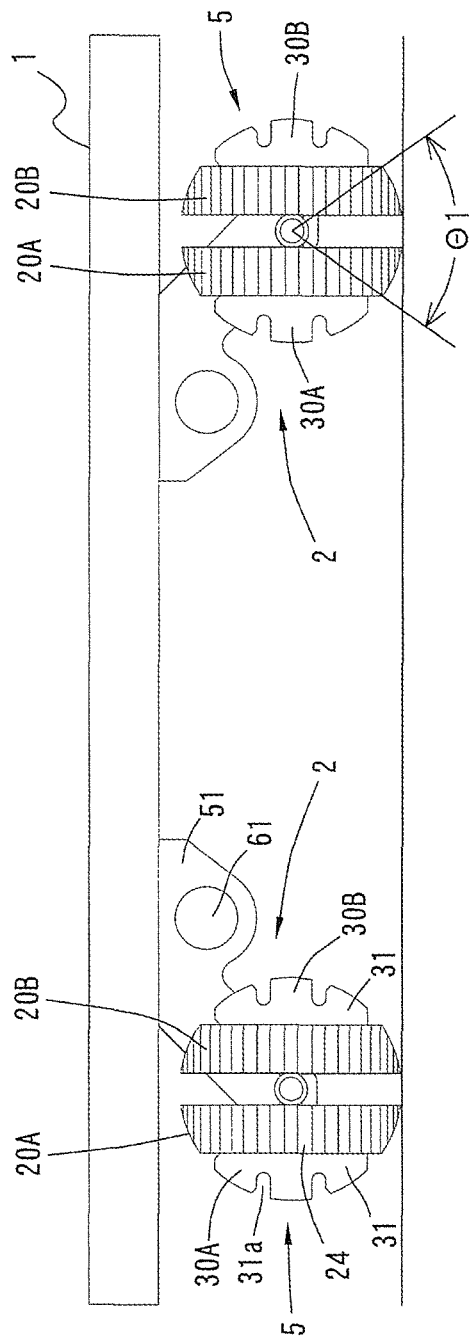
FIG. 3 is a side view of the robot viewed from a direction of arrow A in FIG. 1, shown with some features thereof omitted.

As shown in FIGS. 1 to 3, the robot includes a body 1 having a shape of a flat plate. Observation devices such as a video camera and a work arm that can be used for various works as necessary or the like are mounted on the body 1. A transceiver and a battery are also mounted on the body 1. Movement control to be described later is performed according to control signals from a remote controller 71 (shown only in FIG. 7).

A pair of crawler devices 2, 2 are disposed on an under surface of the body 1. The crawler devices 2, 2 are spaced from each other in the direction Y.

Each of the crawler devices 2, 2 includes a crawler unit 5 having an elongated configuration extending in the direction X. The crawler unit 5 can be rolled about a first rotational axis L1 extending in the direction X as will be described later.

Figure 6:
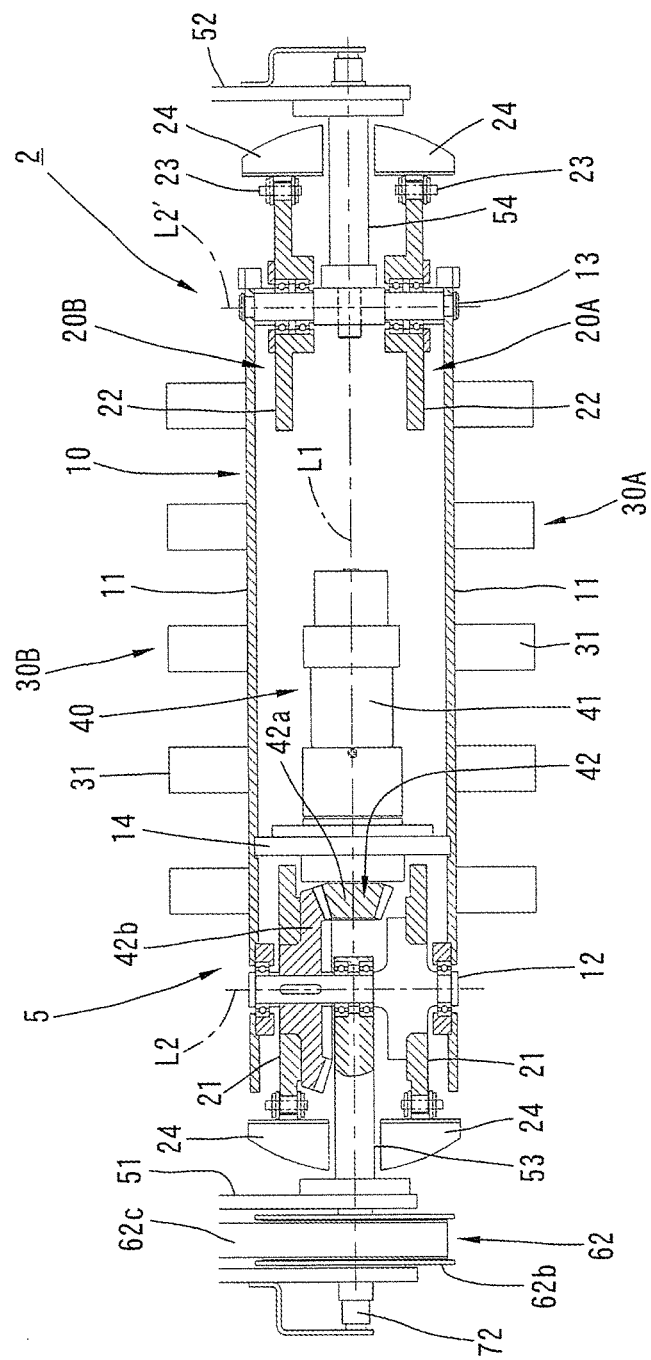
FIG. 6 is a longitudinal sectional view of the crawler unit.

As shown in FIG. 6, the crawler unit 5 includes a support 10, a pair of crawler structures 20A, 20B mounted on the support 10 and a pair of ground contacting structures 30A, 30B mounted on the support 10.

The support 10 includes a pair of elongated side plates 11 extending in parallel to each other in the direction X (direction of the first rotational axis L1) and opposed to each other with the first rotational axis L1 extending therebetween. The support 10 also includes a driver shaft 12 rotatably connected to one end portions of the side plates 11, a driven shaft 13 connected to the other end portions of the side plates 11 and a fixed plate 14 fixed to intermediate portions of the side plates 11.

Central axes L2, L2' of the driver shaft 12 and the driven shaft 13 extend in parallel to each other in a direction orthogonal to the first rotational axis L1. The central axes L2, L2' are respectively provided as rotational axes (second rotational axes) of sprocket wheels 21, 22 to be described later.

The pair of crawler structures 20A, 20B are spaced from and opposed to each other with the first rotational axis L1 extending therebetween. Each of the crawler structures 20A, 20B includes a set of a driver sprocket wheel 21 (wheel) and a driven sprocket wheel 22 (wheel) spaced from each other in the direction of the first rotational axis L1, a chain 23 (endless elongated member) wrapped around the sprocket wheels 21, 22 and a lot of tread lugs 24 made of rubber, for example, and fixed to the chain 23 at even intervals.

The driver sprocket wheel 21 of one crawler structure 20A is directly fixed to the driver shaft 12 and the driver sprocket wheel 21 of the other crawler structure 20B is fixed to the driver shaft 12 via a bevel gear 42b to be described later.

The driven sprocket wheels 22, 22 of the pair of crawler structures 20A, 20B are rotatably supported by the driven shaft 13.

The pair of ground contacting structures 30A, 30B are disposed adjacent to the pair crawler structures 20A, 20B outside of the crawler structures 20A, 20B in a direction of the second rotational axes L2, L2'. Each of the ground contacting structures 30A, 30B includes a plurality (five in this embodiment) of ground contacting plates 31 (ground contacting members) spacedly arranged in the direction of the first rotational axis L1. The ground contacting plates 31 are made of rubber, for example, and fixed to outer surfaces of the side plates 11. The ground contacting plates 31 are protruded orthogonally from the side plates 11 in the direction of the second rotational axes L2, L2'.

As shown in FIG. 3, the pair of crawler structures 20A, 20B and the pair of ground contacting structures 30A, 30B corporate to provide the crawler unit 5 with a circular cylindrical configuration. Specifically, outer surfaces of the tread lugs 24 of the crawler structures 20A, 20B and outer surfaces of the ground contacting plates 31 of the ground contacting structures 30A, 30B have circular-arc configurations, and are arranged along an imaginary circular cylindrical surface about the first rotational axis L1 between the sprocket wheels 21, 22. A notch 31a is formed on the outer surface of the ground contacting plate 31.

In this embodiment, as shown in FIG. 6, a crawler actuator 40 for rotationally driving the pair of crawler structures 20A, 20B is disposed inside of the crawler unit 5.

The crawler actuator 40 includes a motor 41 fixed to the fixed plate 14 of the support 10 and a torque transmitting mechanism 42 that transmits a rotational torque of the motor 41 to the driver sprocket wheels 21, 21 of the crawler structures 20A, 20B. The torque transmitting mechanism 42 includes a bevel gear 42a fixed to an output shaft of the motor 41 and a bevel gear 42b engageable with the bevel gear 42a. The rotary torque of the motor 41 is transmitted to the driver sprocket wheel 21 of the crawler structure 20B via the bevel gears 42a, 42b, and further transmitted to the driver sprocket wheel 21 of the crawler structure 20A via the driver shat 12. Thereby, the pair of crawler structures 20A, 20B are driven at the same time at the same speed in the same direction. The motor 41 can be rotated in normal and reverse directions.

As shown in FIGS. 2 and 6, opposite end portions of the crawler unit 5 are supported by the body 1 such that the crawler unit 5 is rotatable about the first rotational axis L1. Details are as given below.

A pair of brackets 51, 52 are fixed to the under surface of the body 1. The brackets 51, 52 are disposed away from each other in the direction of the first rotational axis L1 with the crawler unit 5 disposed therebetween.

A torque transmitting shaft 53 (torque transmitting member) disposed along the first rotational axis L1 is rotatably supported by the bracket 51. The torque transmitting shaft 53 extends to an inside of the crawler unit 5 via a gap between one end portions of the pair of crawler structures 20A, 20B. A distal end portion of the torque transmitting shaft 53 is connected to the driver shaft 12 of the support 10. In this connected states, the driver shaft 12 is allowed to be rotated about the second rotational axis L2.

A support shaft 54 (support member) disposed along the first rotational axis L1 is rotatably supported by the bracket 52. The support shaft 54 extends to the inside of the crawler unit 5 via a gap between the other end portions of the pair of crawler structures 20A, 20B. A distal end portion of the support shaft 54 is fixed to the driven shaft 13 of the support 10. The support shaft 54 may be fixed to the bracket 52 and rotatably connected to the driven shaft 13.

As shown in FIG. 2, the crawler unit 5 is rotated about the first rotational axis L1 by a rolling actuator 60. The rolling actuator 60 includes a motor 61 fixed to the bracket 51 and a torque transmitting mechanism 62 that transmits a rotary torque of the motor 61 to the torque transmitting shaft 53. The motor 61 can be rotated in normal and reverse directions.

The torque transmitting mechanism 62 includes a timing pulley 62a fixed to an output shaft of the motor 61, a timing pulley 62b fixed to the torque transmitting shaft 53 and a timing belt 62c wrapped around the timing pulleys 62a, 62b.

Figure 4:
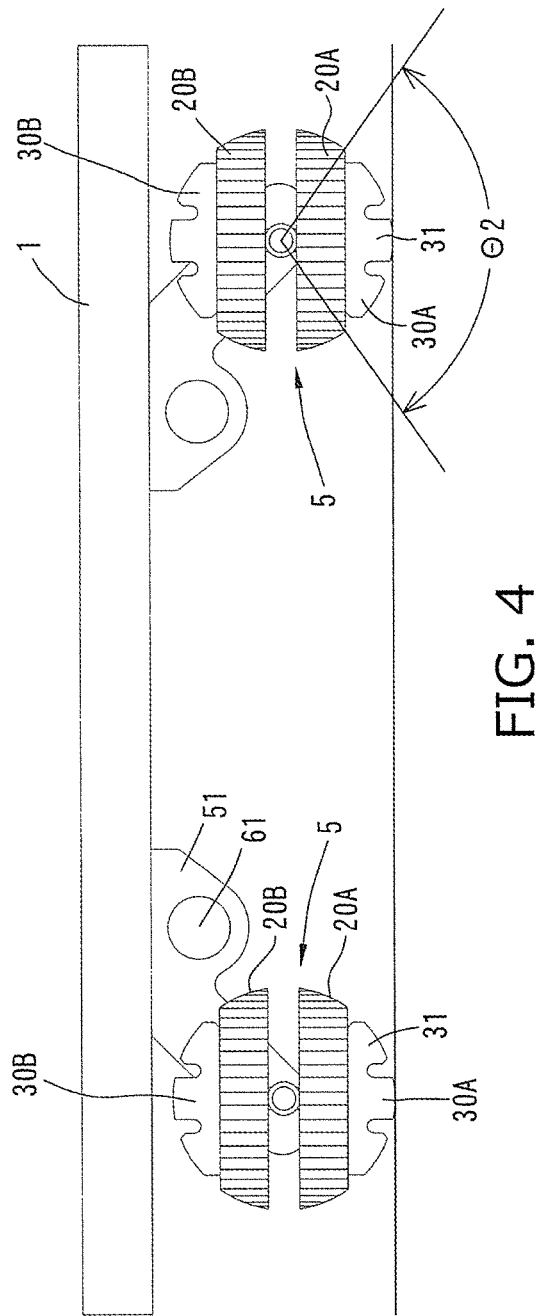
FIG. 4 is a side view of the robot, shown in a state in which respective attitudes of crawler units of the crawler devices are different from those shown in FIG. 3 by 90 degrees.
Figure 5:
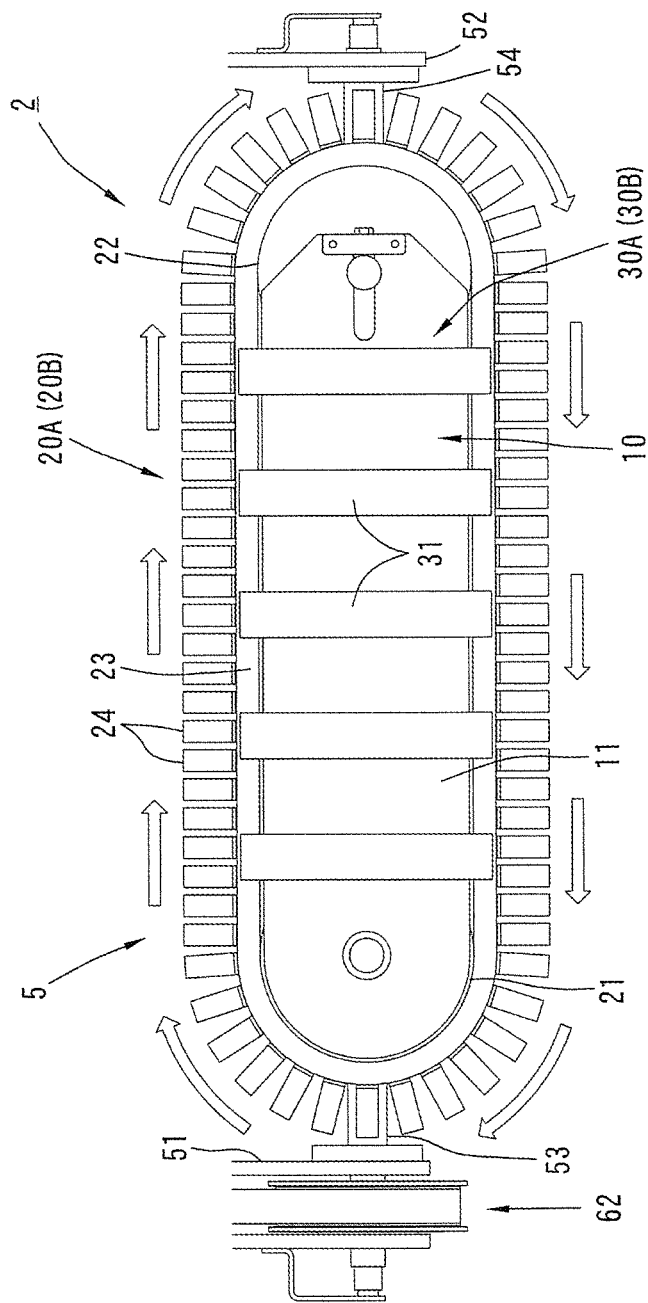
FIG. 5 is a side view of the crawler unit viewed from a direction of arrow B in FIG. 1.

As shown in FIGS. 3 and 4, an attitude of the crawler unit 5 is changed by rolling. Of an outer periphery of the crawler unit 5, an angular range Θ1 occupied by the crawler structures 20A, 20B is a movable zone and an angular range Θ2 occupied by the ground contacting structures 30A, 30B is a dead zone. In a state where the crawler unit 5 is contacted with the ground at the movable zone, at least one of the crawler structures 20A, 20B is contacted with the ground. Therefore, the crawler moving can be performed by driving the crawler structures 20A, 20B. In a state where the crawler unit 5 is contacted with the ground at the dead zone, the crawler structures 20A, 20B are not contacted with the ground. Therefore, even if the crawler actuator 40 is driven, the crawler structures 20A, 20B are turned idly, and the crawler moving cannot be performed.

Figure 7:
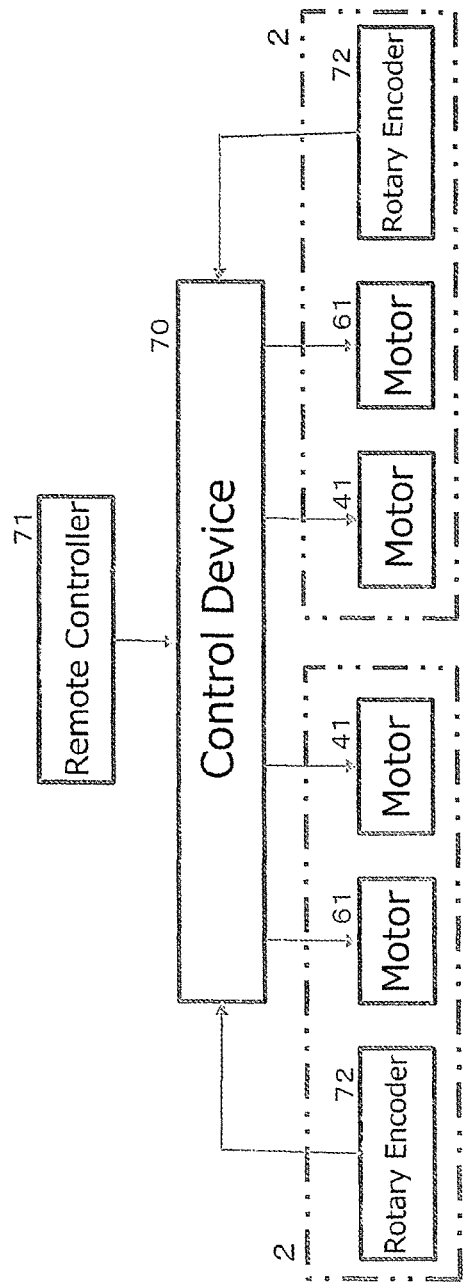
FIG. 7 is a system chart for controlling movement of the robot.

A system for controlling movement of the robot having the features mentioned above includes a control device 70, a remote controller 71 and rotary encoders 72 as shown in FIG. 7. The control device 70 is disposed on the body 1. As shown in FIG. 6, in each of the crawler devices 2 the rotary encoder 72 is disposed on the bracket 51 and detects a rotation angle of the torque transmitting shaft 53, and thereby detecting the attitude of the crawler unit 5. The rotary encoder 72 may detect a rotation angle of the support shaft 54.

The movement of the robot by the pair of crawler devices 2, 2 will be described below. In each of the crawler devices 2, 2, if the motor 41 of the crawler actuator 40 is driven in a state where the pair of crawler structures 20A, 20B are contacted with the ground as shown in FIG. 3 or in a state where one of the crawler structures is contacted with the ground, the driver sprocket wheels 21, 21 of the crawler structures 20A, 20B are rotationally driven at the same time in the same direction. Thereby, the crawler device 2 can be moved in the direction X (crawler moving). By rotating the motors 41, 41 of the pair of crawler devices 2, 2 in the same direction at the same speed, the robot can be moved straight in the direction X.

When the motors 61 of the rolling actuators 60 of the pair of crawler devices 2 are driven, the crawler units 5 are rotated (rolling) about the first rotational axis L1. By the pair of crawler devices 2 performing rolling at the same time in the same direction, the robot can be moved straight in the direction Y (moving by rolling).

While the crawler unit 5 is rolling, the tread lugs 24 of the crawler structures 20A, 20B and the ground contacting plates 31 of the ground contacting structures 30A, 30B are alternately contacted with the ground, thereby alternately bearing the load.

By switching from being driven by one of the motors 41, 61 to the other of the motors 41, 61, a direction of movement can be changed 90 degrees without pivoting the body 1.

The robot can be moved linearly in an oblique direction by driving both of the motors 41, 61 at the same time and controlling speed and direction of rotation of the motors (oblique moving). In the oblique moving, upper and lower portions of the crawler structures 20A, 20B frequently switch positions by the rolling of the crawler unit 5. However, by switching the direction of rotation of the motor 41 while the crawler unit 5 is contacted with the ground at the dead zone thereof (while the ground contacting plates 31 of the ground contacting structures 30 are contacted with the ground), the robot can be surely moved in the oblique direction.

As mentioned above, the crawler moving can be performed only while the crawler unit 5 is contacted with the ground at the movable zone. When the pair of crawler structures 20A, 20B are contacted with the ground as particularly shown in FIG. 3, the crawler moving can be securely performed. The attitude of the crawler unit shown in FIG. 3 is referred to as a reference attitude.

A control for making the crawler unit 5 take the movable attitude (reference attitude in this embodiment) so as to surely start the crawler moving will be described below in detail.

Figure 8:
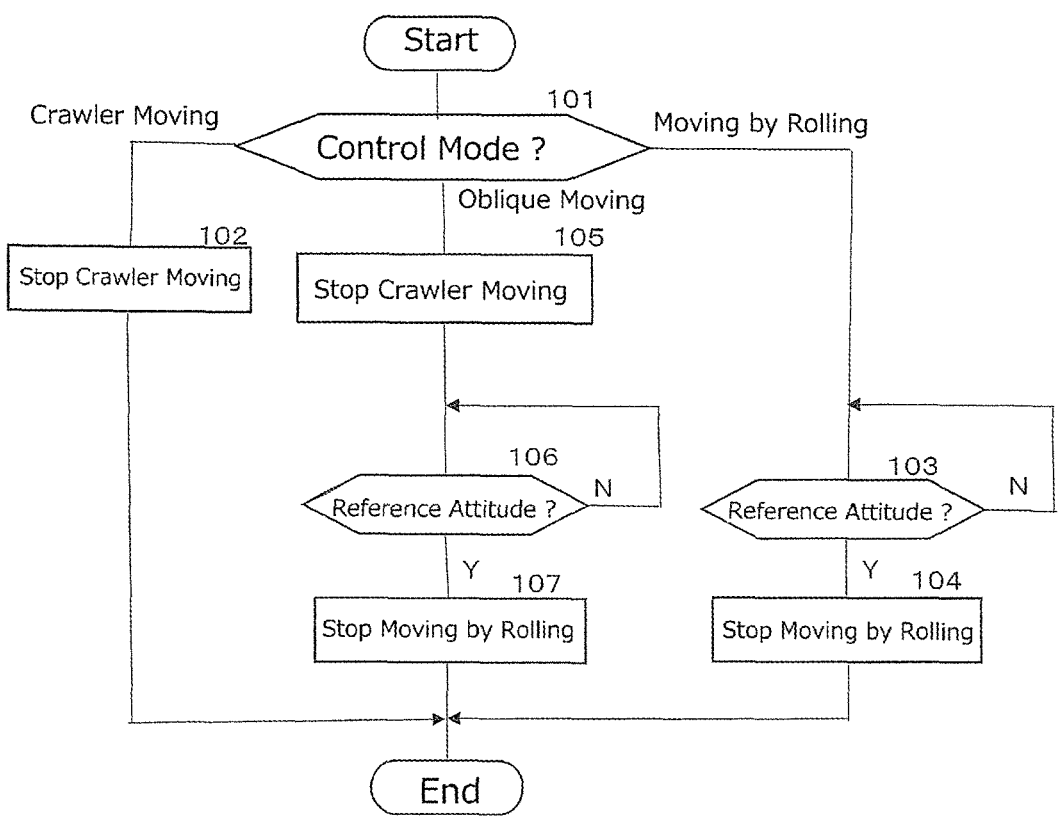
FIG. 8 is a flow chart of an attitude control of the crawler units performed upon receipt of a movement stop command signal while the robot is being moved.

FIG. 8 shows a control performed when the control device 70 receives a movement stop command signal from the remote controller 71 while the robot is being moved.

In Step 101, a current control mode is determined. If it is determined that the crawler moving is being performed, the workflow proceeds to Step 102, where the motors 41 are stopped, thereby the crawler moving being stopped.

If it is determined that the moving by rolling is being performed in Step 101, a judgment is made whether the pair of crawler units 5 are in the reference attitudes or not in Step 103. If the judgment is negative, the moving by rolling is continued. That is, the rolling is continued in the same direction as the direction in which the moving by rolling was performed before receiving the movement stop command signal. If the judgment is positive in Step 103, the motors 61 are stopped to stop the moving by rolling.

If it is determined that the oblique moving is being performed in Step 101, the crawler moving is stopped in Step 105, then the workflow proceeds to Step 106, where a judgment is made whether the pair of crawler units 5 are in the reference attitudes or not. If the judgment is negative, the moving by rolling is continued. That is, the rolling is continued in the same direction as before receiving the movement stop command signal. If the judgment is positive in Step 106, the workflow proceeds to Step 107, where the moving by rolling is stopped.

As mentioned above, the attitudes of the crawler units 5 are controlled to take the reference attitudes as a final step of movement after receiving the movement stop command signal. Therefore, no problem will be posed for the next crawler moving or the next oblique moving.

Figure 9:
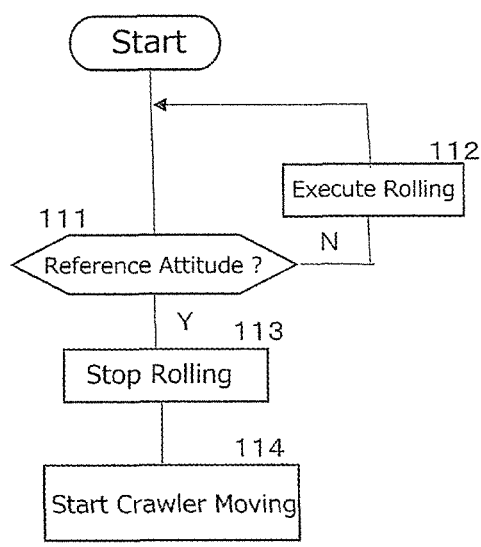
FIG. 9 is a flow chart of the attitude control of the crawler unit performed upon receipt of a crawler moving start command signal while the robot is not being moved.

In the control mentioned above, the attitudes of the crawler units 5 are controlled after receiving the movement stop command signal. Alternatively, as shown in FIG. 9, the attitudes of the pair of crawler units 5 may be controlled immediately before starting the crawler moving after receiving a crawler moving start command signal in a state where the robot is stopped. Specifically, in Step 111, a judgment is made whether the crawler units 5 are in the reference attitudes or not. If the judgment is negative, the workflow proceeds to Step 112, where the pair of crawler units 5 are made to roll in a same direction. The direction of rolling may be a predetermined direction or may be a direction in which the crawler units 5 can easily reach the reference attitudes from the current attitudes. If the judgment is positive in Step 111, the workflow proceeds to Step 113, where the rolling is stopped, and then to Step 114, where the crawler moving is started.

Figure 10:
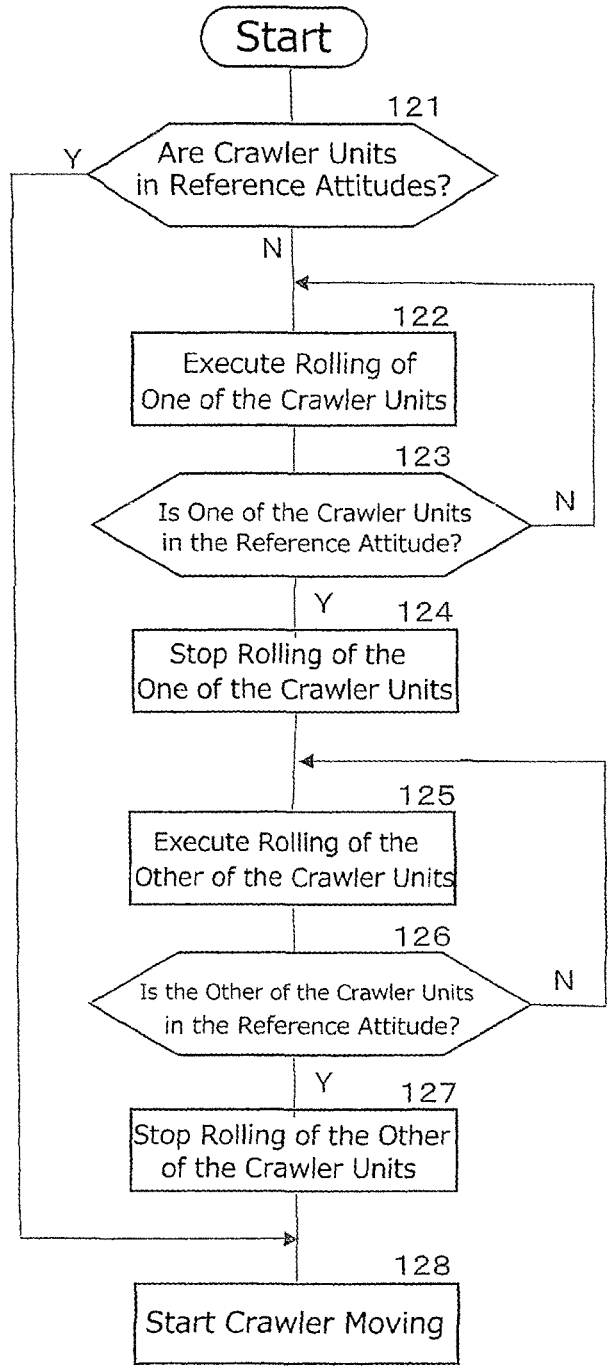
FIG. 10 is a flow chart of an attitude control of the crawler unit according to another aspect of the present invention, performed upon receipt of a crawler moving start command signal while the robot is not being moved.

In the control shown in FIG. 9, the robot is moved in the direction Y through a distance corresponding to the rolling of the crawler unit 5 for the attitude control. Thus, a starting point of the robot for the crawler moving is sifted. In the control shown in FIG. 10, the shifting can be constrained.

In a state where the robot is stopped, upon receiving the crawler moving start command signal, a judgment is made whether the pair of crawler units 5 are in the reference attitudes or not in Step 121. If the judgment is positive, the workflow proceeds to Step 128, where the crawler moving is started immediately.

If the judgment is negative in Step 121, the workflow proceeds to Step 122, where the rolling of one of the crawler units 5 is executed. Since the other of the crawler units 5 is stopped at this time, the movement of the robot by rolling can be constrained.

If it is determined that the one of the crawler units 5 reaches the reference attitude in Step 123, the workflow proceeds to Step 124, where the rolling of the one of the crawler units 5 is stopped.

Next, in Step 125, rolling of the other of the crawler units 5 is executed. Since the one of the crawler units 5 is stopped at this time, the movement of the robot by rolling can be constrained.

Next, in Step 126, if it is determined that the other of the crawler units 5 reaches the reference attitude, the workflow proceeds to Step 127, where the rolling of the other of the crawler units 5 is stopped, and then to Step 128, where the crawler moving is started.

Figure 11:
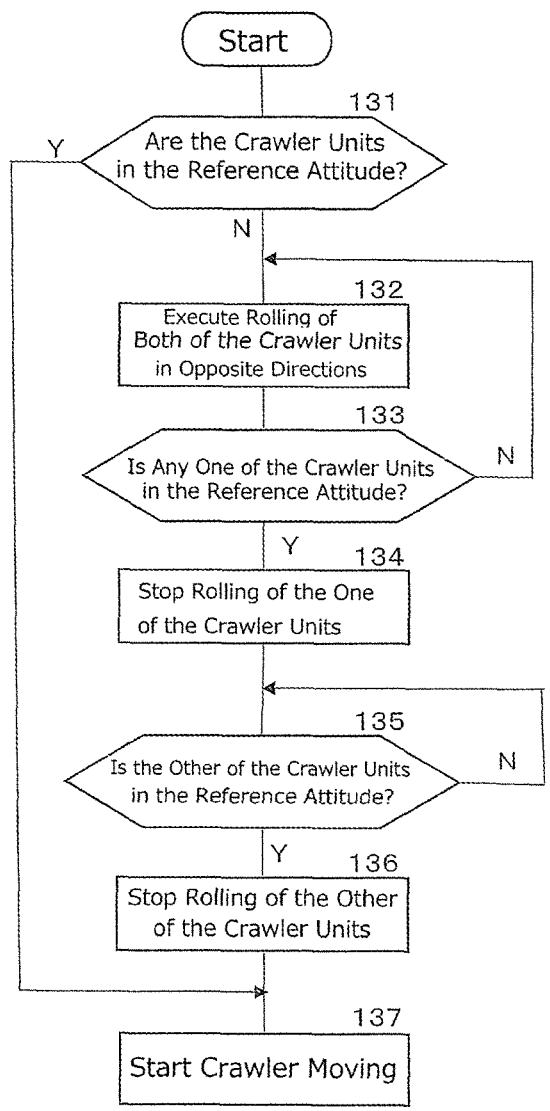
FIG. 11 is a flow chart of an attitude control of the crawler unit according to still another aspect of the present invention, performed upon receipt of a crawler moving start command signal while the robot is not being moved.

In the control shown in FIG. 11, the shifting of the movement start point by the attitude control of the pair of crawler units 5 can be further constrained. Specifically, in a state where the robot is stopped, upon receiving the crawler moving start command signal, a judgment is made whether the crawler units 5 are in the reference attitudes or not in Step 131. If the judgment is positive, the workflow proceeds to Step 137, where the crawler moving is started immediately.

If the judgment is negative in Step 131, the workflow proceeds to Step 132, where the crawler units 5 are made to roll in opposite directions. Therefore, the robot is hardly moved.

Next, in Step 133, a judgment is made whether one of the crawler units 5 reaches the reference attitude or not. If the judgment is positive, the workflow proceeds to Step 134, where the rolling of the one of the crawler units 5 is stopped. Next, in Step 135, a judgment is made whether the other of the crawler units 5 reaches the reference attitude or not. If the judgment is negative, the other of the crawler units 5 is made to continue rolling. If the judgment is positive, the workflow proceeds to Step 136, where the rolling of the other of the crawler units 5 is stopped, and then to Step 137, where the crawler moving is started.

In the control shown in FIG. 11, if the control device receives the crawler moving start command when the pair of crawler units 5 are in the attitudes shown in FIG. 4, the pair of crawler units 5 reach the reference attitudes at the same time, and the pair of crawler units 5 are made to stop rolling at the same time.

Figure 12:
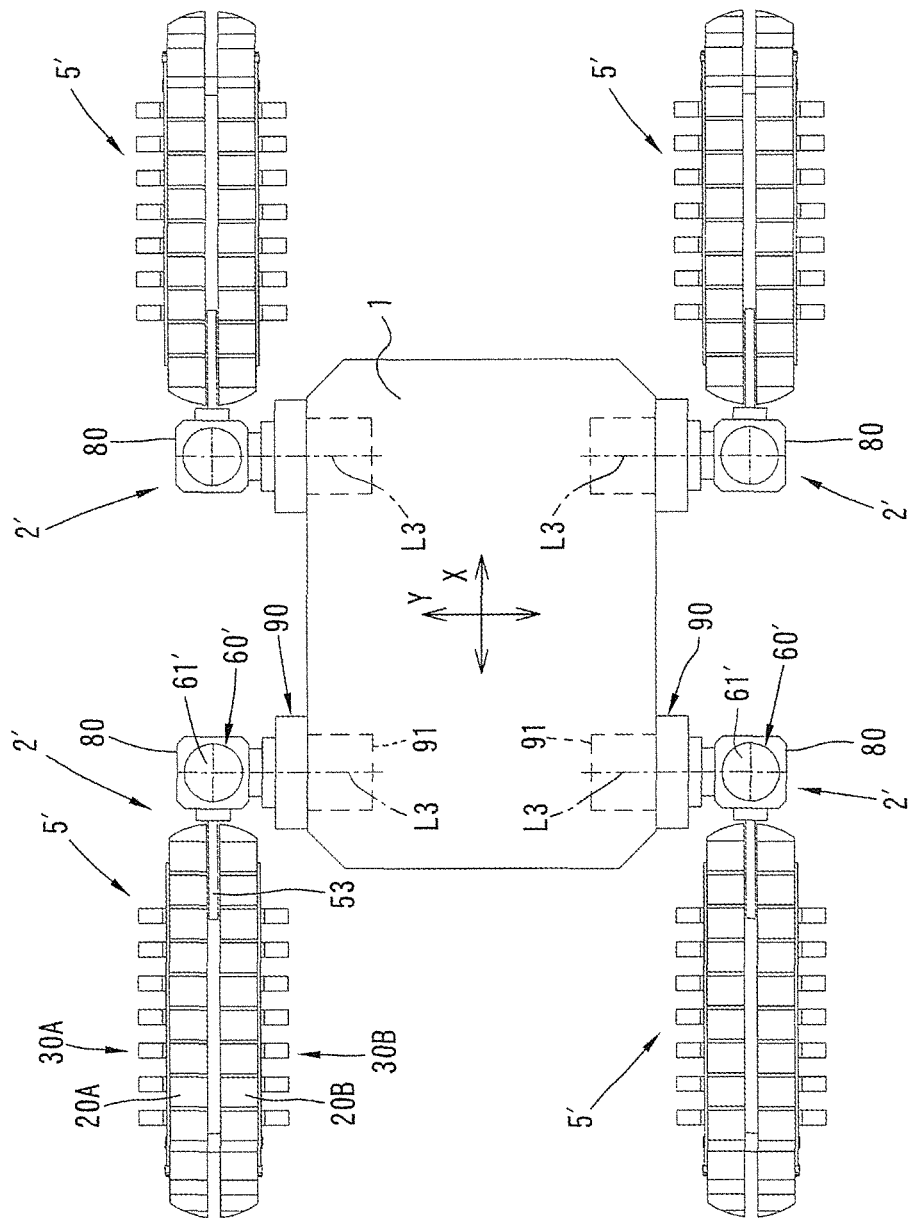
FIG. 12 is a plan view of a robot (traveling apparatus) according to a second embodiment of the present invention having flipper-type crawler devices incorporated therein.
Figure 13:
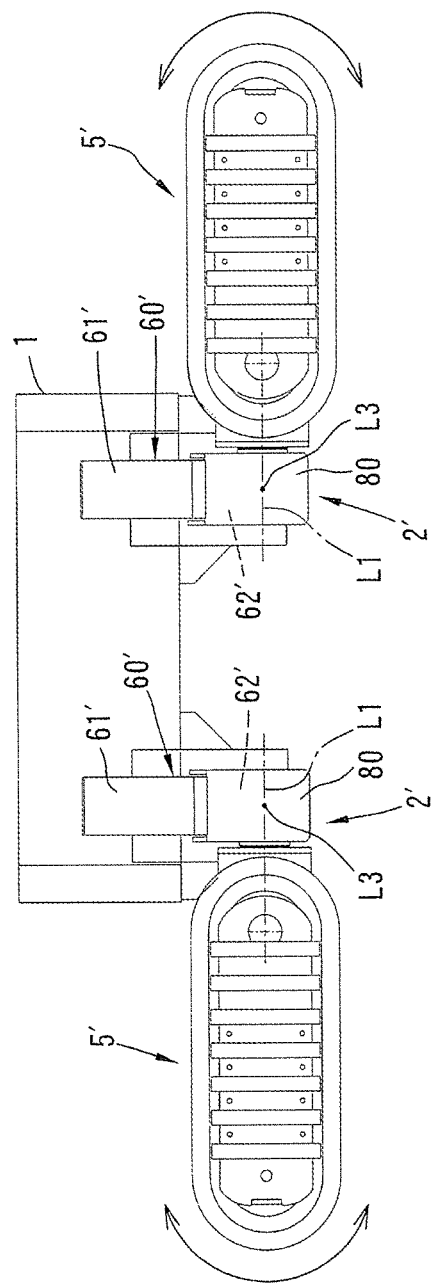
FIG. 13 is a side view of the robot according to the second embodiment.

A second embodiment of the present invention will be described hereinafter with reference to FIGS. 12 and 13. In the description of the second embodiment, same or similar reference numerals are used for features corresponding to those of the first embodiment, and detailed description thereof will be omitted.

A robot includes two pairs of flipper-type crawler devices 2'.

In the crawler device 2' of the second embodiment, one end portion of the crawler unit 5' is supported by a support 80 having a shape of a box such that the crawler unit 5' is rotatable about the first rotational axis L1. The other end portion of the crawler unit 5' is a free end.

A rolling actuator 60' is provided in the support 80. Specifically, a motor 61' of the rolling actuator 60' is fixed on a top surface of the support 80 and a torque transmitting mechanism 62' is received in an inside of the support 80. A rotary torque of the motor 61' is transmitted to the crawler unit 5 via the torque transmitting mechanism 62' and a torque transmitting shaft 53, and the crawler unit 5' is rolled.

The support 80 is supported by a flipper actuator 90 disposed in the body 1 such that the support 80 is rotatable about a third rotational axis L3. The third rotational axis L3 extends in a direction Y. The third rotational axes L3 of the pair of crawler devices 2' opposed to each other in the direction Y extend along a same straight line.

The support 80 is rotated by a motor 91 of the flipper actuator 90 in normal and reverse directions about the third rotational axis L3. As a result, the crawler unit 5' is rotated 180 degrees in a vertical direction as indicated by arrows in FIG. 13. When the robot is moved forward and encounters an obstacle, the robot can be easily moved over the obstacle owing to the rotation of the crawler unit 5' in the vertical direction.

The control shown in FIGS. 8 to 11 can also be performed in the second embodiment. The control may be performed regarding the two crawler devices 2' disposed on one side in the direction Y as the one crawler device 2 of the first embodiment and the two crawler devices 2' disposed on the other side in the direction Y as the other crawler device 2 of the first embodiment.

The present invention is not limited to the embodiments described above, and various modifications may be adopted.

In the embodiments described above, the crawler units are controlled so as to take the reference attitudes shown in FIG. 3 as the movable attitudes. Alternatively, the movable attitude may be any attitude as long as the crawler unit is contacted with the ground at the movable zone in the angular range Θ1. In this case, in the judgment steps of the control shown in FIGS. 8 to 11, the judgment may be made whether "the crawler unit 5 is contacted with the ground at the movable zone or not" in place of the judgment "whether the crawler unit is in the reference attitude or not".

Feedback signals for the attitude control of the crawler unit may be signals from an inclination sensor disposed on the support 10 in place of the rotary encoder.

The crawler structure may be composed of a pair of wheels and a belt that is wrapped around the wheels and engageable with an outer periphery of the wheels by friction or by pins.

In the first embodiment, the crawler unit 5 may be rotatably supported at one end thereof.

In the movement control of the robot, the "oblique moving" may be omitted, and only the "crawler moving" and the "moving by rolling" may be performed.

The remote controller may be omitted. In this case, the control device of the robot may automatically perform the selection of the movement control mode, the start moving and the stop moving, performing the attitude control of the crawler unit based on the signals from the various sensors.

The arrangement of the crawler actuator and the rolling actuator is not limited to that of the embodiments described above, and various modifications may be adopted. For example, the motor of the crawler actuator may be disposed outside of the crawler unit in a similar manner to the rolling actuator. If this arrangement is applied to the first embodiment, for example, the motor 41 may be fixed to the bracket 52 outside of the crawler unit 5. The support shaft 54 may extend long inside the crawler unit 5, an inner end of the support shaft 54 may be fixed to the bevel gear 42a and an outer end of the support shaft 54 may be connected to the motor 41.

INDUSTRIAL APPLICABILITY

The present invention may be applied to a traveling apparatus such as a robot that can be moved in two directions.

The invention claimed is:

1. A traveling apparatus comprising:
   a body; and
   a plurality of crawler devices supported by the body and extending in a first direction, the plurality of crawler devices spaced from one another in a second direction orthogonal to the first direction,
   wherein each of the plurality of crawler devices includes a crawler unit supported by the body such that the crawler unit is rotatable about a first rotational axis extending in the first direction, a crawler actuator and a rolling actuator;
   each crawler unit includes a support extending along the first rotational axis and a pair of crawler structures disposed on the support spaced from each other with the first rotational axis extending therebetween;
   the traveling apparatus performs crawler moving in the first direction by the crawler actuator driving the pair of crawler structures;
   the traveling apparatus performs moving by rolling in the second direction by the rolling actuator making the crawler unit roll about the first rotational axis;
   the crawler unit includes a movable zone and a dead zone, wherein when the crawler unit is contacted with the ground at the movable zone, at least one of the pair of crawler structures is contacted with the ground, and the crawler moving can be performed by driving the crawler structures, and wherein when the crawler unit is contacted with the ground at the dead zone, the crawler moving cannot be performed by driving the crawler structures;
   the traveling apparatus further includes attitude sensors that respectively detect attitudes of the crawler units and a control device that controls the crawler actuators and the rolling actuators; and
   to prepare for the crawler moving, the control device performs an attitude control of the crawler units by driving the rolling actuators based on attitude information of the crawler units from the attitude sensors to make the crawler units respectively take movable attitudes in which the crawler units are contacted with the ground at the respective movable zones.

2. The traveling apparatus according to claim 1, wherein upon receipt of a stop command signal during the moving by rolling, the control device judges whether the crawler units are in the movable attitudes or not based on the attitude information from the attitude sensors, and if the judgment is positive, the control device immediately makes the traveling apparatus stop moving, and if the judgment is negative, the control device makes the crawler units continue to roll until the crawler units respectively take the movable attitudes.

3. The traveling apparatus according to claim 1, wherein the control device makes the traveling apparatus perform oblique moving by performing the moving by rolling and the crawler moving at the same time, and upon receipt of a stop command signal during the oblique moving, the control device immediately makes the traveling apparatus stop crawler moving and judges whether the crawler units are in the movable attitudes or not based on the attitude information from the attitude sensors, and if the judgment is positive, the control device immediately makes the traveling apparatus stop moving by rolling, and if the judgment is negative, the control device makes the crawler units continue to roll until the crawler units respectively take the movable attitudes.

4. The traveling apparatus according to claim 1, wherein upon receipt of a start command signal to start the crawler moving while the traveling apparatus is stopped, the control device judges whether the crawler units are in the movable attitudes or not based on the attitude information from the attitude sensors, and if the judgment is positive, the control device immediately makes the traveling apparatus start the crawler moving, and if the judgment is negative, the control device makes the traveling apparatus start the crawler moving after making the crawler units roll until the crawler units respectively take the movable attitudes.

5. The traveling apparatus according to claim 4, wherein if the judgment is negative, the control device controls the attitudes of the plurality of crawler units by making the plurality of crawler units roll in the same direction.

6. The traveling apparatus according to claim 4, wherein the plurality of crawler units include a pair of crawler units, if the judgment is negative, the control device keeping one of the crawler units stopped, the control device makes the other of the crawler units roll, and after finishing the attitude control of the other of the crawler units, the control device controls the attitude of the one of the crawler units, keeping the other of the crawler units stopped.

7. The traveling apparatus according to claim 4, wherein the plurality of crawler units include a pair of crawler units, and
   if the judgment is negative, the control device makes the pair of crawler units roll at the same time in opposite directions, and thereby controlling the attitudes of the pair of crawler units.

8. The traveling apparatus according to claim 1, wherein the movable attitudes of the crawler units are reference attitudes in which the pair of crawler structures are contacted with the ground.

9. The traveling apparatus according to claim 1, wherein each of the crawler structures of the crawler unit includes a pair of wheels disposed spaced from each other in the direction of the first rotational axis, an endless elongated member wrapped around the wheels and a multitude of tread lugs attached to the endless elongated member, the pair of wheels are supported by the support such that the wheels are rotatable about second rotational axes that are parallel to each other and orthogonal to the first rotational axis, a pair of ground contacting structures are attached to the support of the crawler unit, the ground contacting structures are disposed adjacent to the pair of crawler structures outside of the crawler structures in the direction of the second rotational axes, and the ground contacting structures provide the dead zones.

10. A method for controlling a traveling apparatus, the traveling apparatus comprising:

a body; and a plurality of crawler devices supported by the body and extending in a first direction, the plurality of crawler devices spaced from one another in a second direction orthogonal to the first direction, wherein each of the plurality of crawler devices includes a crawler unit supported by the body such that the crawler unit is rotatable about a first rotational axis extending in the first direction, a crawler actuator and a rolling actuator, each crawler unit includes a support extending along the first rotational axis and a pair of crawler structures disposed on the support spaced from each other with the first rotational axis extending therebetween, the traveling apparatus performs crawler moving in the first direction by the crawler actuator driving the pair of crawler structures, the traveling apparatus performs moving by rolling in the second direction by the rolling actuator making the crawler unit roll about the first rotational axis, the crawler unit includes movable zones and dead zones, wherein when the crawler unit is contacted with the ground at the movable zone, at least one of the pair of crawler structures is contacted with the ground, and the crawler moving can be performed by driving the crawler structures, and wherein when the crawler unit is contacted with the ground at the dead zone, the crawler moving cannot be performed by driving the crawler structures, the method comprising:

controlling attitudes of the crawler units to prepare for crawler moving by driving the rolling actuators based on attitude information of the crawler units from attitude sensors to make the crawler units respectively take movable attitudes in which the crawler units are respectively contacted with the ground at the movable zones.

* * * * *